(12) United States Patent
Jones et al.

(10) Patent No.: US 11,369,091 B2
(45) Date of Patent: Jun. 28, 2022

(54) FUME BOARD

(71) Applicants: Edgar Reeves Jones, Jackson, MS (US); Nicholas Dadant, Hamilton, IL (US)

(72) Inventors: Edgar Reeves Jones, Jackson, MS (US); Nicholas Dadant, Hamilton, IL (US)

(*) Notice: Subject to any disclaimer, the term of this patent is extended or adjusted under 35 U.S.C. 154(b) by 180 days.

(21) Appl. No.: 16/925,053

(22) Filed: Jul. 9, 2020

(65) Prior Publication Data

US 2020/0337273 A1  Oct. 29, 2020

Related U.S. Application Data

(63) Continuation-in-part of application No. 15/998,439, filed on Aug. 15, 2018, now abandoned.

(60) Provisional application No. 62/545,547, filed on Aug. 15, 2017.

(51) Int. Cl.
*A01K 55/00* (2006.01)
*A01K 51/00* (2006.01)

(52) U.S. Cl.
CPC .............. *A01K 55/00* (2013.01); *A01K 51/00* (2013.01)

(58) Field of Classification Search
CPC ........ A01K 55/00; A01K 51/00; A01K 59/00; A01K 47/06; A01M 13/00; A01M 13/003
See application file for complete search history.

(56) References Cited

U.S. PATENT DOCUMENTS 1,999,890 A * 4/1935 Bill .................. A01K 51/00 449/52
3,456,056 A * 7/1969 Reich ................ A01K 51/00 514/159

FOREIGN PATENT DOCUMENTS

| CN | 105475262 A | * | 4/2016 | .......... A01M 1/2061 |
| DE | 102020111422 A1 | * | 10/2021 | ............ A01M 1/223 |
| EP | 1787511 A1 | * | 5/2007 | .......... A01M 1/2033 |
| KR | 20080014946 A | * | 2/2008 | ............ A01K 51/00 |
| WO | WO-2011094201 A | * | 8/2011 | ............ A01K 49/00 |

* cited by examiner

*Primary Examiner* — Kathleen I Alker
(74) *Attorney, Agent, or Firm* — Michael C. Williams; Bradley Arant Boult Cummings LLP

(57) ABSTRACT

Embodiments of a fume board are disclosed. In one embodiment, a fume board includes a fume board box, a blower, a repellant liner, and an air diverter. The fume board box has an upper panel and an open bottom face oppositely vertically disposed from the upper panel. The upper panel defines an air intake portal and an interior surface where the repellant liner is attached on the interior surface of the upper panel. The blower is configured to generate an air flow. The air diverter is connected to the blower through the air intake portal, wherein the air diverter is configured to redirect the air flow across the repellant liner. In this manner, the air flow can be provided with low air pressure but still more evenly capture the repellant volatized from the repellant liner to remove the bees from the honey super.

20 Claims, 10 Drawing Sheets

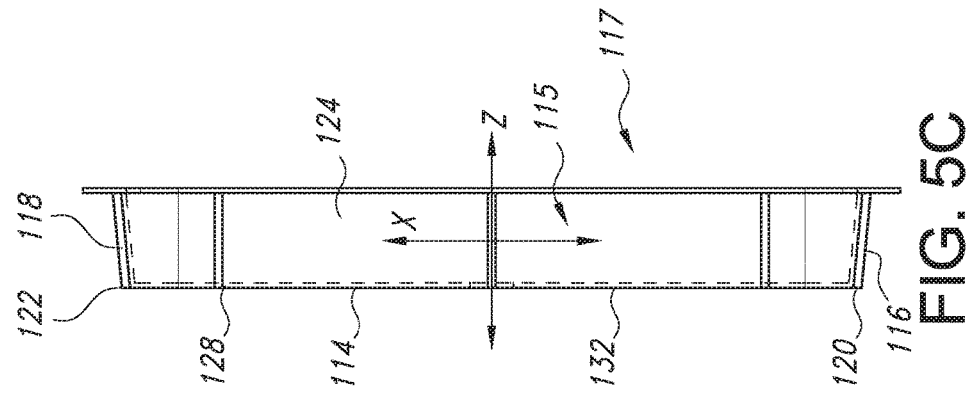
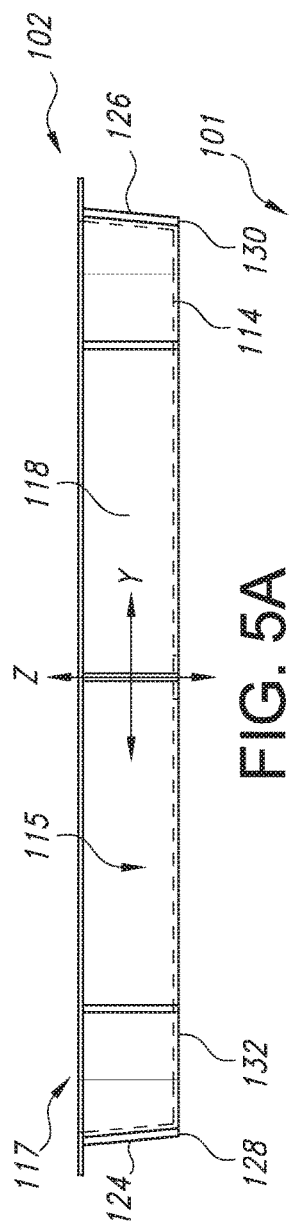
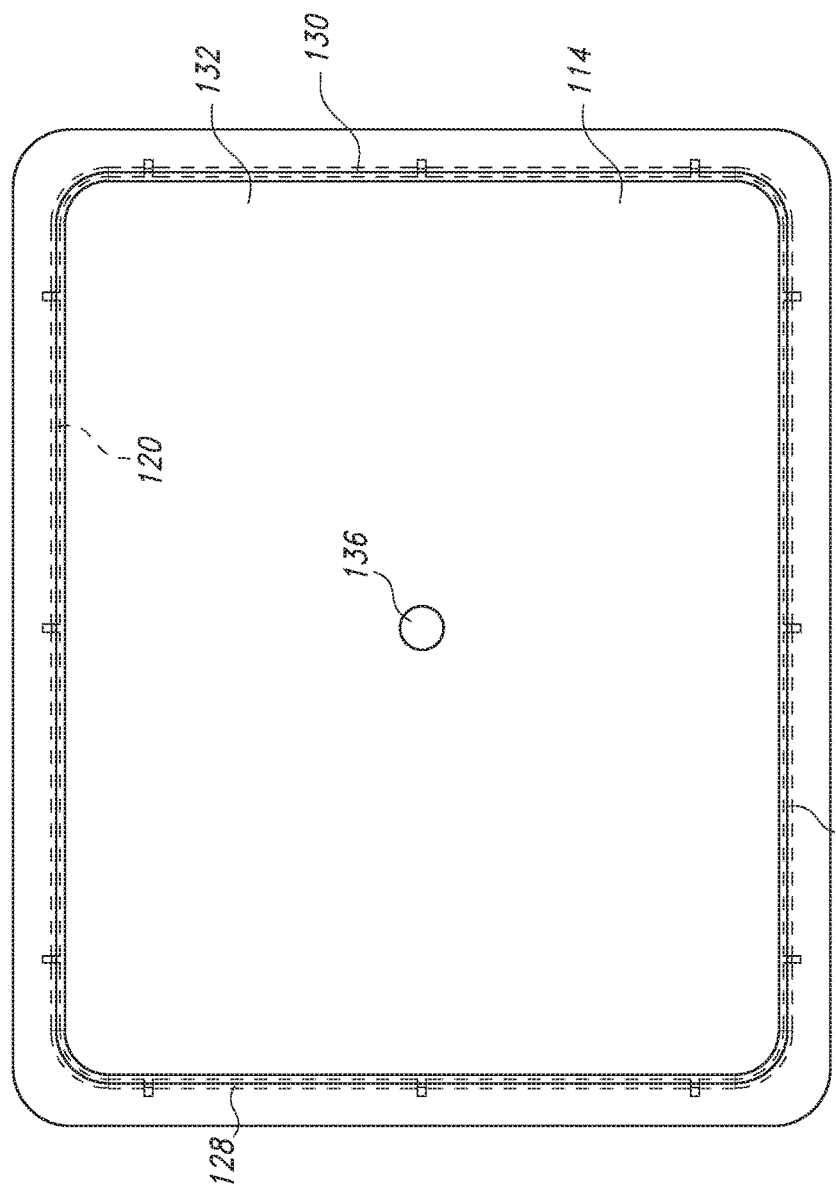

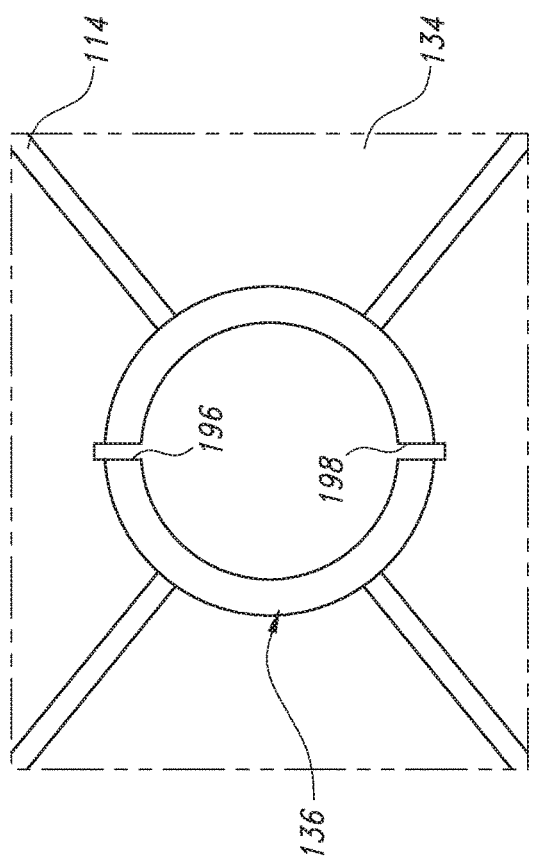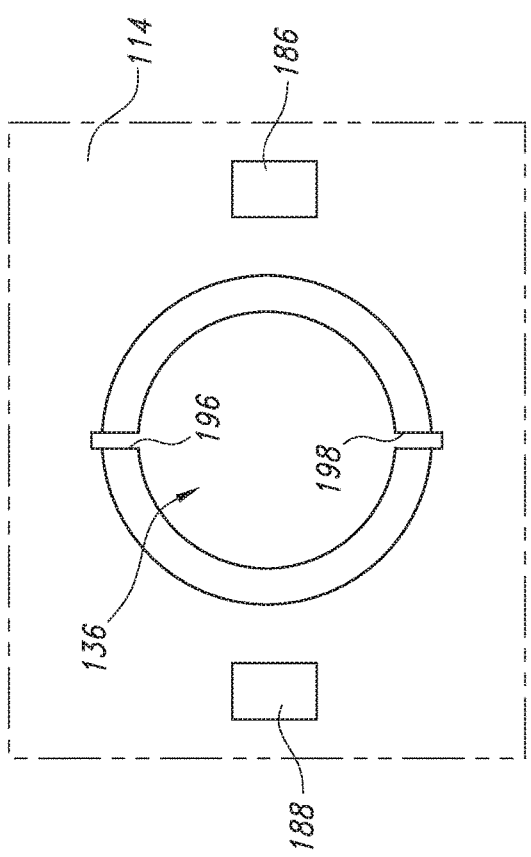

FUME BOARD

RELATED APPLICATIONS

This application claims the benefit of U.S. Non-Provisional patent application Ser. No. 15/998,439, filed Aug. 15, 2018, the disclosure of which is hereby incorporated herein by reference in its entirety. This application also claims the benefit of U.S. Provisional patent application Ser. No. 62/545,547 filed Aug. 15, 2017, the disclosure which is hereby incorporated herein by reference in its entirety.

FIELD OF THE DISCLOSURE

This disclosure relates to fume boards for removing bees from a honey super.

BACKGROUND

Honey production requires extraction of raw honey from wax-capped foundations held in honey "supers" within artificial bee hives. Frames are filled with honey within the honey super by the artificial hives bees. The remainder of the hive is provided in the artificial hive's brood box since the hive's queen is prevented from entering the honey super. To harvest the honey, a beekeeper removes the bees from the honey super in order to remove the honey filled frames.

Consequently, the time and effort required to remove bees from supers prior to honey extraction impacts directly on the profitability of honey production. There are generally three ways of removing bees from hive supers: 1) manually; 2) with an escape device; and 3) with a chemical repellant applied to a fume board. Manual removal, e.g. use of high-powered gasoline blowers, tends to agitate bees, often causing the bees to exit the hive. Manual removal of bees is also a time-consuming process not suitable for commercial beekeepers with hundreds of hives. Hive escape devices, such as escape boards, allow bees to pass down from the honey super into the brood box, but prevents the bees from returning back to the honey super. One escape board is required every 24 hours per super resulting in a large number of escape boards and amount of time required to harvest honey from multiple hives. Finally, fume boards sprayed with a chemical bee repellant are by far the most popular method for removing bees from supers prior to honey extraction and in various forms have been used for many years.

For instance, U.S. Pat. No. 3,122,473, incorporated herein by references in its entirety, describes in very general terms various means for utilizing chemical repellants like propionic or acetic acid to remove bees from honey supers. The patent describes various methods for bee repellant dispersal including placing a repellant soaked cloth pad on a piece of composition board and allowing it to volatize near an open super; using natural air currents or enhanced circulation to circulate repellant throughout the supers; or alternatively, to place the repellant soaked material "in an enclosure having an opening through which air is forced into the enclosure, and an exit opening which is adapted for attaching to a super."

In 1969, a method was patented to introduce into a bee hive effective amounts of nontoxic organic acid or base for repelling bees from honey supers, {see U.S. Pat. No. 3,456, 056, incorporated herein by reference.) The patent describes a wooden hive cover (body member) with an absorbent pad affixed under the cover with an adhesive. The pad is soaked with an irritant compound, which slowly vaporizes into the super, causing the bees to evacuate the super. Today, the device is generally known as a "traditional fume board." A traditional fume board refers to a wood-frame box that sits on top of a honey super with a thin metal top and an open bottom. The top is lined with a soft foam or absorbent fabric such as felt or burlap, which the beekeeper sprays with a non-toxic bee repellant.

Traditional fume boards do not have moving parts and instead use the heat of the sun to warm the metal top, which in turn heats and volatizes the repellant, thus speeding up dispersal of the repellant throughout the super. Traditional fume boards do not work well on cool or cloudy days because they rely on the sun's heat to help disperse the repellant. Even on sunny days, it is not unusual for traditional fume boards take from 10 to 30 minutes to move bees from a super.

A "breeze board" (or "breeze box") is a variation of the traditional fume board. A breeze board uses the wind to accelerate dispersal of bee repellant down into the honey super, thus reducing the time required to move bees from a super. Unlike a traditional fume board, which has absorbent fabric attached to the underside of its metal top, a breeze board has thin, porous fabric stretched across its open bottom. Instead of a flat top, a breeze board's top has a relatively large hole into which a short metal or plastic elbow pipe is fitted. Wind enters the pipe and travels down into the breeze box, where it passes through the repellant saturated porous fabric, dispersing the repellant fumes down into the super. Breeze boards can be heavy and cumbersome to move from hive to hive, and only work on windy days. Additionally, it is difficult to control the volume of wind entering a breeze board and consequently, if the wind volume is too high, too much of the chemical repellent is forced into the super, causing the bees to become intoxicated or flee the hive in a swarm.

SUMMARY

Embodiments of a fume board are disclosed. In one embodiment, a fume board includes a fume board box, a blower, a repellant liner, and an air diverter. The fume board box has an upper panel and an open bottom face oppositely vertically disposed from the upper panel. The upper panel defines an air intake portal and an interior surface where the repellant liner is attached on the interior surface of the upper panel. The blower is configured to generate an air flow. The air diverter is connected to the blower through the air intake portal, wherein the air diverter is configured to redirect the air flow across the repellant liner. In this manner, the air flow can be provided with low air pressure but still more evenly capture the repellant volatized from the repellant liner to remove the bees from the honey super.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWINGS

The accompanying drawings incorporated in and forming a part of this specification illustrate several aspects of the disclosure, and together with the description serve to explain the principles of the disclosure.

FIG. 5A-FIG. 5C illustrate different features of one embodiment of a fume board box.

FIG. 9A and FIG. 9B illustrate one embodiment of an air intake portal and an upper panel of a fume board box.

DETAILED DESCRIPTION

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

Disclosed are embodiments of fume boards that employ blowers to quickly and uniformly deliver repellant throughout a honey super so as to remove the bees in an efficient manner. The fume boards disclosed herein may not need the sun, breezes or a hot day to assist in repellant dispersal since specialized techniques are disclosed utilizing blowers to increase repellant dispersal while significantly decreasing the time required for evacuation of bees from a honey super.

Figure 1:
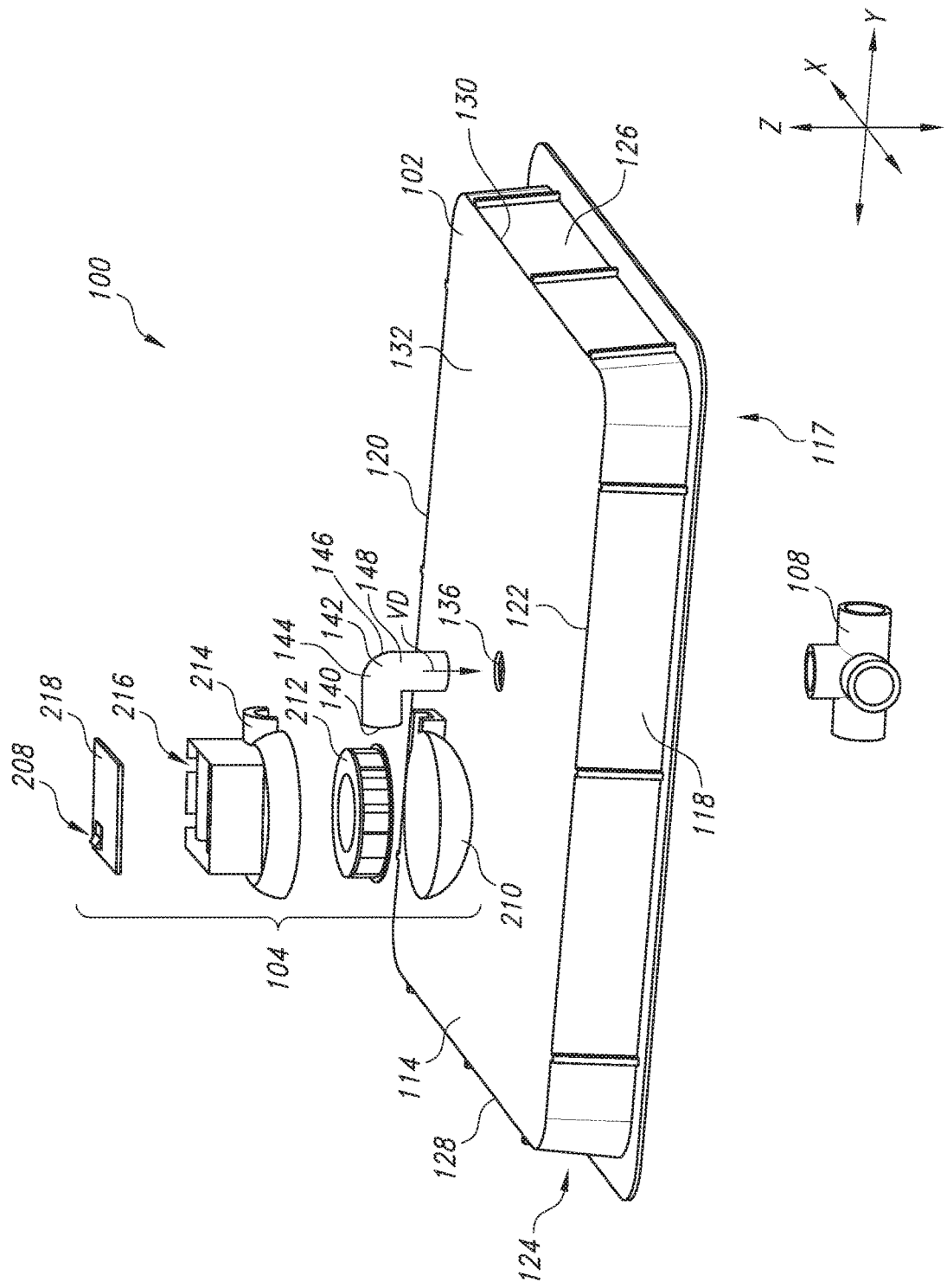
FIG. 1 illustrates an exploded perspective view of one embodiment of a fume board.
Figure 2:
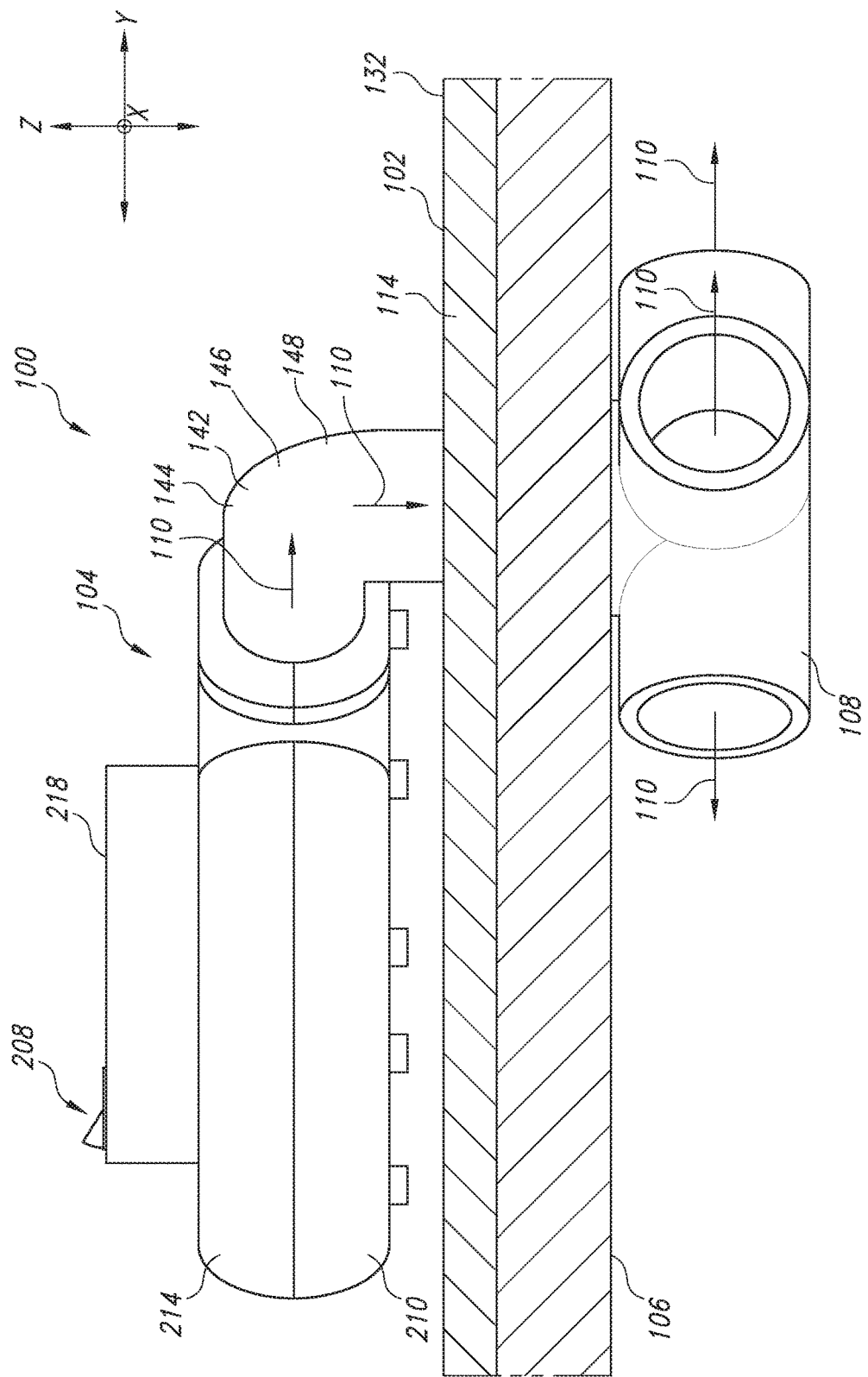
FIG. 2 illustrates a cross sectional view of the fume board shown in FIG. 1.
Figure 3:
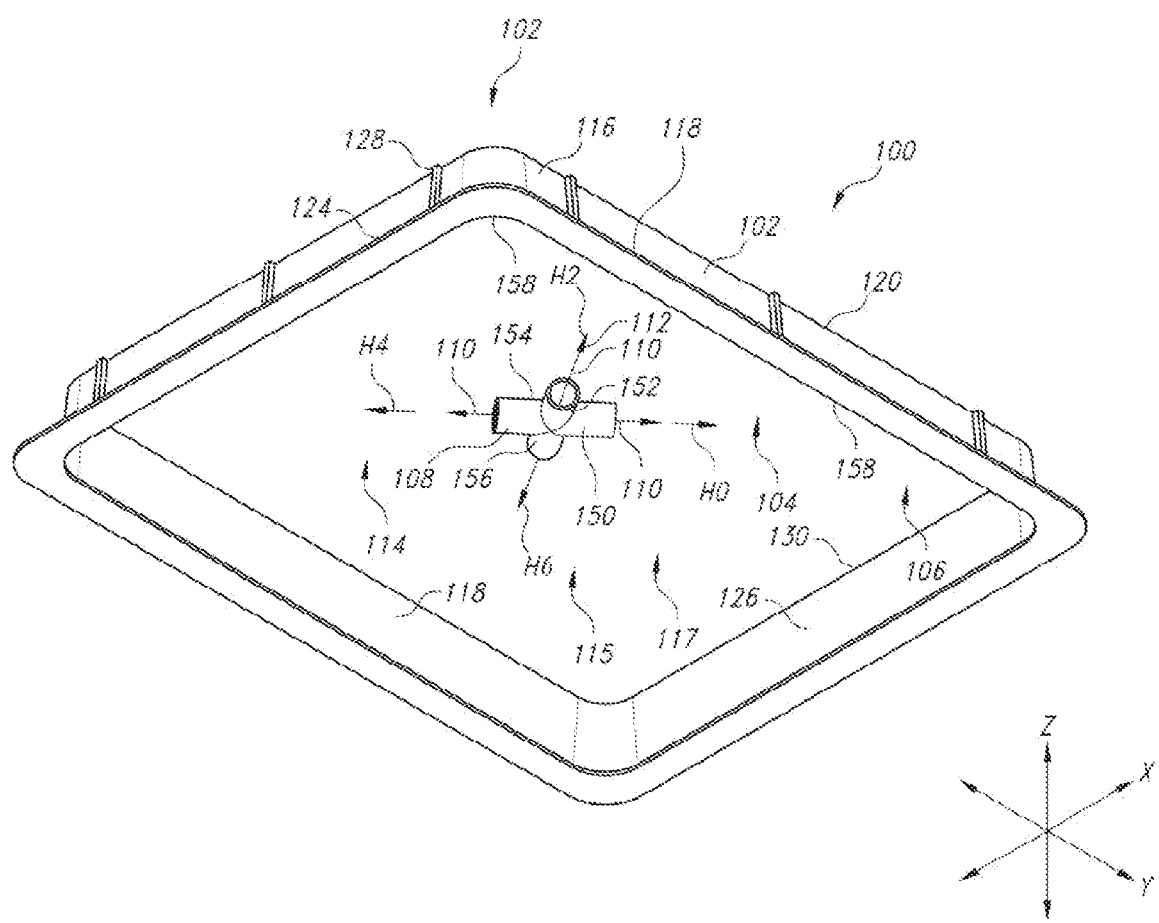
FIG. 3 illustrates a bottom view of the fume board shown in FIG. 1.
Figure 4:
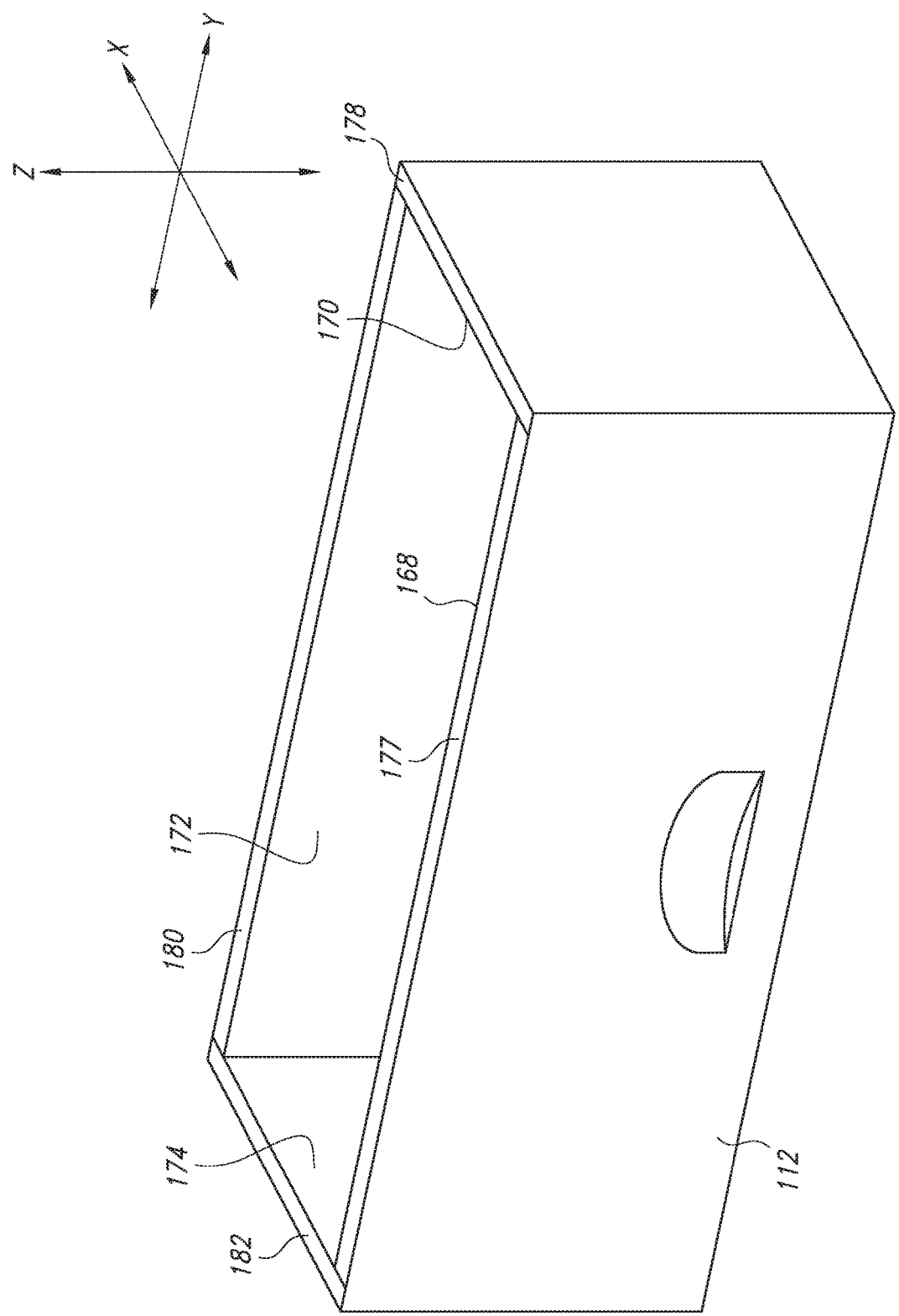
FIG. 4 illustrates one embodiment of a honey super.

FIG. 1-3 illustrates one embodiment of a fume board 100. The fume board 100 includes a fume board box 102, a blower 104, a repellant liner 106, and an air diverter 108. The blower 104 is configured to generate an air flow 110. In this embodiment, the blower 104 is a motorized air blower that is configured to operate a fan that intakes air and feeds it into an air duct system. The fume board box 102 is configured to rest on top of a honey super 112 (shown in FIG. 4) when a top (not explicitly shown) of the honey super 112 has been removed. The fume box board 102 defines an enclosure that encloses an enclosure area 115, except that the fume box board 102 defines an open face 117. The open face 117 leads into the enclosure area 115. As explained in further detail below, the fume board box 102 is configured to rest on top of the honey super 112 so that the fume box board 102 closes the top of the honey super 112. In this manner, bee repellant from the repellant liner 106 will flow into the honey super 112 from the repellant liner 106 and through the open face 117 and drop into the honey super 112. Bees will thus leave the honey super 112, which allows for the honey in the honey super 112 to be harvested.

Directions are defined relative to how the fume board 100 rests when on the honey super 112. In this embodiment, the z-axis defines the vertical up and down direction, the x-axis defines horizontal directions along the width of the honey super 112, and a y-axis defines horizontal directions along the length of the honey super 112. The fume board box 102 is designed for a rectangular honey super, such as the honey super 112 shown in FIGS. 1-3. However, it should be noted that other embodiments of the fume board box 102 may be designed for a honey super of any shape including rectangular, square, round, triangular, or irregular.

Referring now to FIGS. 1-3 and FIGS. 5A-5C. The fume board box 102 includes an upper panel 114 that extends parallel to the x-y plane. In this embodiment, side panels 116, 118 extend from the edges 120, 122 of the upper panel 114 that define a length of the upper panel 114. The side panels 116, 118 extend nearly parallel to the y-z plane. However, each of the planes defined by side panels 116, 118 have a slight x component since the side panels 116, 118 are beveled. Additionally, side panels 124, 126 extend from the edges 128, 130 of the upper panel 114 that define a width of the upper panel 114. The side panels 124, 126 extend nearly parallel to the x-z plane. However, each of the planes defined by the side panels has a slight y component since the side panels are beveled. In this case, each of the angles between the upper panel 114 and each of the side panels 116, 118, 124, 126 is slightly obtuse. This is because the cross sectional area along the z-axis of the enclosure area 115 increases from the upper panel 114 to the open face 118. The beveling of the fume board box 102 allows for multiple fume board boxes to be stacked for the purposes of shipping in a compact manner.

The upper panel 114 and the side panels 116, 118, 124, 126 contain the repellant from the repellant liner 106 within the enclosure area 115 until the repellant falls through the open face 117. In this manner, the repellant will fall through the top of the honey super 112 so that the bees leave the honey super 112. It should be noted that any other arrangement for the fume board box 102 that ensures that repellant falls into the honey super 112 may be utilized.

Figure 6:
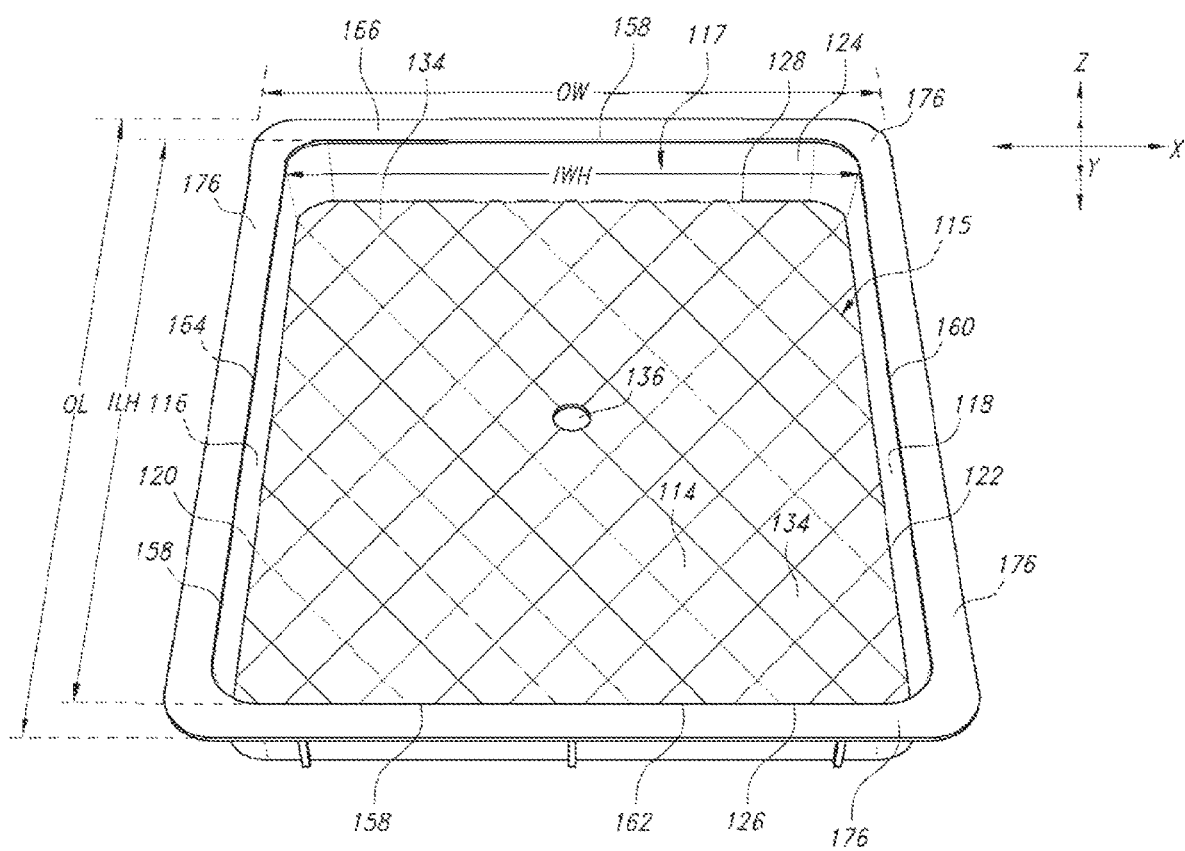
FIG. 6 illustrates a bottom view of the fume board box shown in FIG. 5A-FIG. 5C without the repellant liner on an interior surface.

As shown in FIG. 2 and FIG. 6, the open face 117 is oppositely vertically disposed from the upper panel 114. Thus, while the upper panel 114 is at the top of the fume board box 102, the open face 117 is at the bottom of the fume board box 102. The upper panel 114 has an exterior surface 132, which in this case is the upper surface of the upper panel 114, and an interior surface 134, which in this case is the lower surface of the upper panel 114. In this embodiment, the upper panel 114 is scored, which appears as an arrangement of raised diagonal supports that cross one another along the interior surface 134. The scoring of the upper panel 114 strengthens the upper panel 114 and makes it easier to attach the repellant liner 106 (as shown in FIG. 3) to the interior surface 134. Any sturdy material or composition of such can be used to construct the fume board box 102, including but not limited to rot-resistant wood (e.g., cedar wood, cypress wood, etc.), plywood, particle board, or other composite materials. Plastic or light-weight metal may also be used to construct the fume board box 102. In some embodiments, the fume board box 102 may be painted black or any another dark color, or covered with a suitable material that readily absorbs and radiates heat from the sun, which will increase volatilization of the repellant sprayed onto the repellant liner 106.

As shown in FIG. 3 and FIG. 6, the repellant liner 106 is attached to the interior surface 134 of the fume board box 102. In this embodiment, the repellant liner 106 covers the entire surface area of the interior surface 134 and thus also extends across a plane parallel to the x-y plane. The repellant liner 106 is generally configured to absorb some form of repellant for repelling bees. In some embodiments, the repellant is a chemical that is absorbed by the repellant liner 106. The repellant evaporates off of the repellant liner 106 and falls through the open face 117 and into the honey super 112. In some embodiments, the fume board box 102 may be painted black or any another dark color, or covered with a suitable material that readily absorbs and radiates heat from the sun, which will increase volatilization of the repellant on the repellant liner 106. The repellant liner 106 may consist of any number of materials such as soft foam, thick felt, or layered cotton fabric or burlap, to name but a few examples. The air blown from the blower 104 through the air diverter 108 mixes with the repellant volatized from the repellant liner 106 or other bee repellant dispersion mechanism and is gently forced down through the top of the honey super 112.

Figure 7:
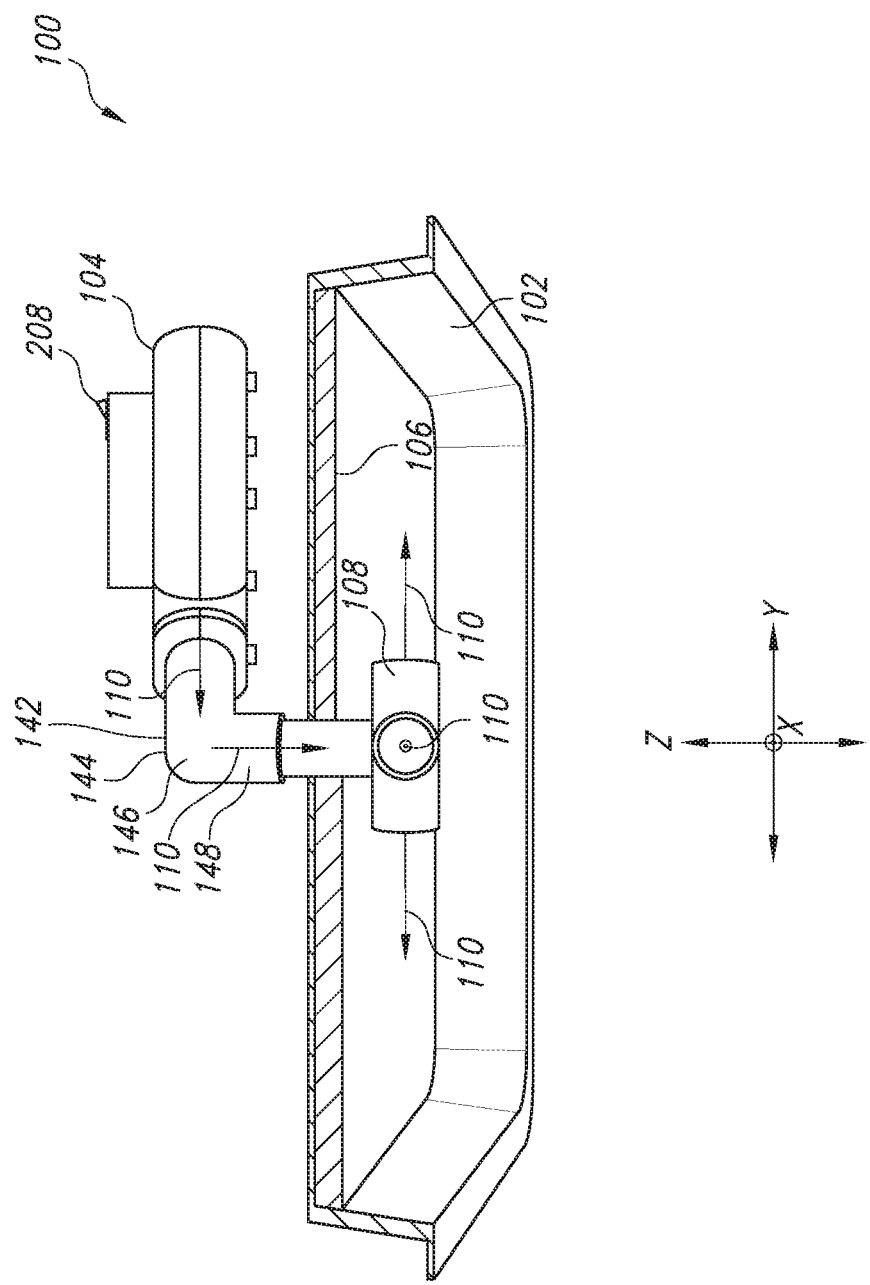
FIG. 7 illustrates a non exploded cross sectional view of the fume board shown in FIG. 1.

As shown in FIG. 1 and FIG. 6, the fume board box 102 defines an air intake portal 136 that extends through the thickness of the upper panel 114. The repellant liner 106 also defines an air intake aperture 138 (shown in FIG. 5B) that is aligned with the air intake portal 136 so that the air intake portal 136 and the air intake aperture 138 lead into the enclosure area 115. As shown, the blower 104 is configured to generate an air flow 110. The air flow 110 is utilized to accelerate and distribute the repellant evaporating off the repellant liner 106 and into the honey super 112. One of the problems of using a blower 104 is how to ensure that the repellant is distributed more evenly into the honey super 112. The repellant may be distributed along the repellant liner 106. In this embodiment, the air intake portal 136 and the air intake aperture 138 are centrally located on the upper panel 114. Furthermore, the blower 104 is supported on the upper panel 114 and has an air exhaust aperture 140 (See FIG. 1) that is oriented so as to initially create the air flow 110 in a horizontal direction. However, in order to enter through the air intake portal 136 and the air intake aperture 138, the air flow 110 needs to be redirected in the vertical downward direction VD (See FIG. 1). As such, the exhaust aperture 140 of the blower 104 is defined by an exhaust conduit 142. As shown in FIG. 7, the exhaust conduit 142 has a horizontal duct 144, and elbow 146, and a vertical duct 148. The horizontal duct 144 is configured to receive the air flow 110 from the air exhaust aperture 140 of the blower 104 in the horizontal direction. The horizontal duct 144 and the vertical duct 148 are connected at the elbow 146 where the elbow provides a change of direction from the horizontal to the vertical so that the vertical duct 148 redirects the air flow 110 in the vertical direction. In this manner, the exhaust conduit 142 is configured to direct the air flow in a vertical downward direction VD into the fume board box 102.

Thus, the air flow 110 is receiving into the fume board box 102 in the vertical downward direction VD. However, if the air flow 110 simply blew into the enclosure area 115 in the vertical downward direction VD there would be a poor distribution of the repellant into the honey super 112. This is because most of the surface area of the repellant liner 106 would be unaffected by the air flow 110 if the air flow 110 simply remained in the vertical downward direction VD. As such, at an exhaust end of the exhaust conduit 142, the exhaust conduit 142 is attached to the air diverter 108. The air diverter 108 is configured to redirect the air flow 110 across the repellant liner 106. In this manner, the air flow 110 will interact across the surface area of the repellant liner 106 so that repellant is more evenly distributed into the honey super 112. In this embodiment, the repellant liner 106 is parallel to the x-y plane and thus the air flow 110 needs to be redirected from the vertical downward direction VD across the surface area of the repellant liner 106.

In this embodiment, the air diverter 108 shown in FIG. 3 has four air ducts 150, 152, 154, 156 that are positioned vertically just underneath the repellant liner 106. Each of the air ducts 150, 152, 154, 156 redirects the air flow 110 from the vertical downward direction VD to one of four horizontal directions H0, H2, H4, H6 where each of the four horizontal directions H0, H2, H4, H6 are all substantially orthogonal to the vertical downward direction VD. Each of the horizontal directions H0, H2, H4, H6 of the air ducts 150, 152, 154, 156 are thus parallel to the plane defined by the repellant liner 106 and thus distribute the air flow 110 across the surface area of the repellant liner 106. In this embodiment, the air duct 150 is configured to redirect the air flow 110 in a horizontal direction H0 that is at approximately 180 degrees relative to the horizontal direction H4 of the air duct 154 and substantially orthogonal to the horizontal direction H2 of the air duct 152 and the horizontal direction H6 of the air duct 156. Additionally, the air duct 152 is configured to redirect the air flow 110 in a horizontal direction H2 that is at approximately 180 degrees relative to the horizontal direction H6 of the air duct 156 and substantially orthogonal to the horizontal direction H0 of the air duct 150 and the horizontal direction H4 of the air duct 154. Furthermore, the air duct 154 is configured to redirect the air flow 110 in a horizontal direction H4 that is at approximately 180 degrees relative to the horizontal direction H0 of the air duct 150 and substantially orthogonal to the horizontal direction H2 of the air duct 152 and the horizontal direction H6 of the air duct 156. Finally, the air duct 156 is configured to redirect the air flow 110 in a horizontal direction H6 that is at approximately 180 degrees relative to the horizontal direction H2 of the air duct 152 and substantially orthogonal to the horizontal direction H0 of the air duct 150 and the horizontal direction H4 of the air duct 154.

In this manner, the air diverter 108 redirects the air flow 110 such that the air flow 110 is distributed and picks up repellant that is evaporating off of the repellant liner 106. The redistribution of the air flow 110 provided by the air diverter 108 also allows for the air flow 110 to be low pressure thereby ensuring that the bees are not hurt by the air flow 110. It should be noted that the air diverter 108 above is simply one example. Other embodiments may include any number of air ducts of one or greater depending on the particular topology of the fume board box 102 and the honey super 112. In one particular embodiment, the air diverter 108 has six different air ducts all separated so that they redirect the air flow in horizontal directions that are 60 degrees apart.

In this embodiment, the air diverter 108 is detachable from the exhaust conduit 142 and thus can be removed when not in use. Because the air diverter 108 is detachable from the exhaust conduit 142, the blower 104 can be easily removed from the fume board box 102, thus improving the mobility of the improved fume board 100 in large apiaries, during shipping, or when stored. The air diverter 108 is not limited to any one design, but includes any number of air diverter shapes and sizes to accomplish air-dispersal in the fume board box 102 for added control of air flow direction and volume. Alternative embodiments of the invention may utilize an air diverter or diverters permanently attached to the underside of the top of the improved fume board box 102 to disperse the air flow 110 from the blower 104 evenly throughout the fume board box 102.

As shown in FIG. 6, the fume board box 102 has been designed to fit the dimensions of the top of the honey super 112 so that the honey super 112 stays firmly in place. In particular, a raised vertical lip 158 extends vertically from each of the edges 160, 162, 164, 166 at the open face 117 of the fume board box 102. The outside edge of the vertical lip 158 is positioned so as to match the width and length of the interior surfaces 168, 170, 172, 174 (See FIG. 4) at the top of the honey super 112. Furthermore, a horizontal lip 176 extends horizontally from each of the edges 160, 162, 164, 166 so as to match the length and width of the top surfaces 177, 178, 180, 182 (See FIG. 4) at the top of the honey super 112. This ensures that the fume board box 102 covers the top of the honey super 112. The vertical lip 158 may press against the interior surfaces 168, 170, 172, 174 at the top of the honey super 112 to prevent the fume board box 102 from sliding out of position. This ensures that the repellant falls into the honey super 112 and prevent bees from escaping from the top of the honey super 112.

In one embodiment, the outer length OL of the fume board box 102 is 20 inches while the outer width OW of the fume board box 102 is 16¼ inches. The inside width IWH and inside length ILH of the honey super 112 are 14¾ and 18⅜ of an inch respectively. The outside edge of the vertical lip are provided at 14⅜ of an inch and 18¼ of an inch. This gives the fume board box 102 a bit of give so as to make it easy to install on the top of the honey super 112.

Figure 8A:
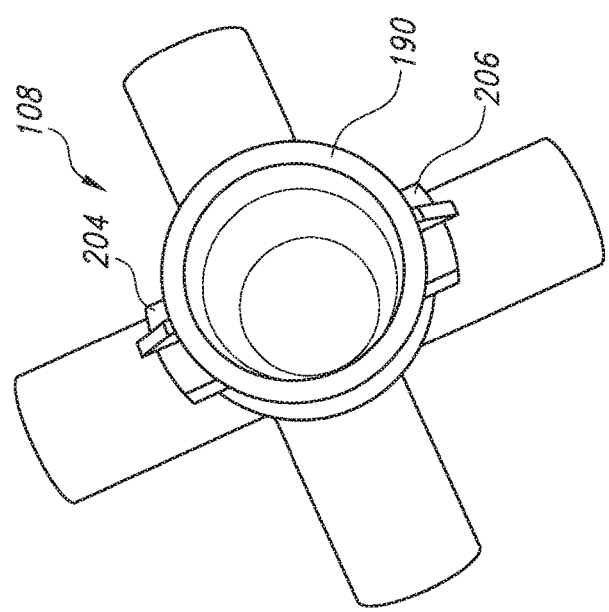
FIG. 8A and FIG. 8B illustrate one embodiment of an air diverter.
Figure 8B:
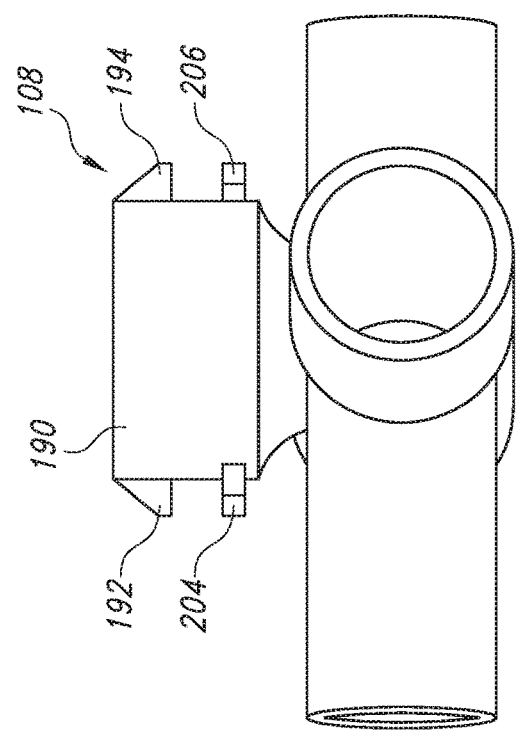
Figure 11:
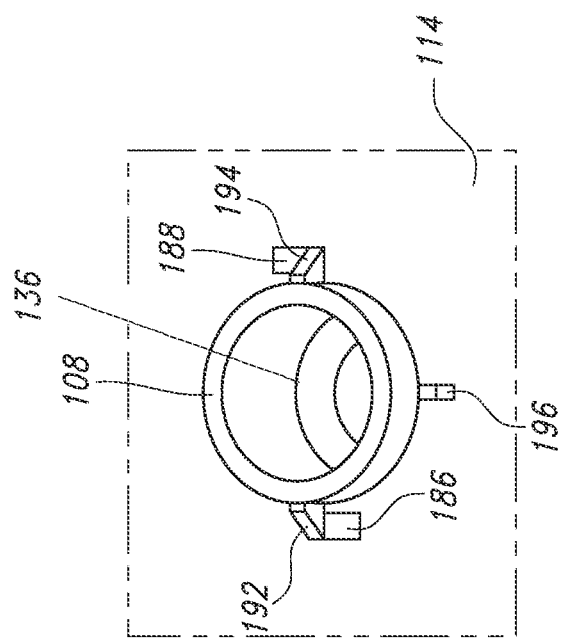
FIG. 11 illustrates the air diverter shown in FIG. 8A and FIG. 8B inserted through the air intake portal shown in FIG. 9A and FIG. 9B.
Figure 10:
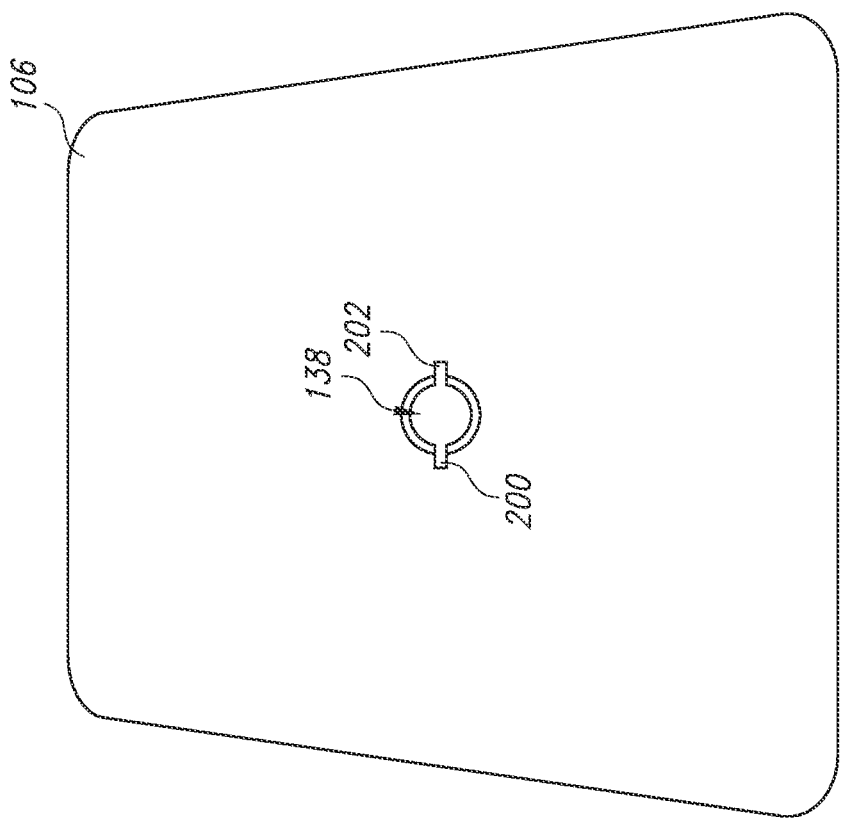
FIG. 10 illustrates one embodiment of a repellant liner.

FIG. 8A and FIG. 8B illustrate a view of one embodiment of the air diverter 108, FIG. 9A illustrates one embodiment of the air intake portal 136 at the interior surface 134 of the upper panel 114, and FIG. 9B illustrates one embodiment of the air intake portal 136 at the exterior surface 132 of the upper panel 114. Furthermore, FIG. 10 illustrates an embodiment of the air intake aperture 138 on the repellant liner 106. Finally, FIG. 11 illustrates an embodiment of the air diverter 108 that is inserted through the air intake portal 136 and the air intake aperture 138 so as to attach to the exhaust conduit 142 (See FIG. 7) thereby connecting to the blower 104.

As shown in FIG. 9B, the exterior surface 132 of the upper panel 114 has a pair of stops 186, 188 that are adjacent to the air intake portal 136. As such, the pair of stops 186, 188 are on an exterior surface 132 of the upper panel 114. The pair of stops 186, 188 are oppositely disposed from one another. In the embodiment shown in FIG. 8A and FIG. 8B, the air diverter 108 has an attachment section 190 that is inserted through the air intake portal 136 and the air intake aperture 138 of the repellant liner 106 that is attached to the interior surface 134 of the upper panel 114.

The attachment section 190 of the air diverter 108 defines a pair of oppositely disposed wings 192, 194. In this embodiment, the attachment section 190 has a cross sectional area along the x-y axis that is round and the wings 192, 194 are positioned 180 degrees apart. Other embodiments of the attachment section 190 may be provided in any suitable shape.

The air intake portal 136 defines a pair of slots 196, 198 that match the shape of the wings 192, 194. In this manner, the pair of slots 196, 198 are configured to receive the pair of wings 192, 194 when the attachment section 190 is inserted through the air intake portal 136. More generally, the air intake portal 136 matches the shape of the cross-sectional area of the attachment section 190 along the x-y axis and the slots 196, 198 are positioned 180 degrees apart. Other embodiments of the air intake portal 136 may be any suitable shape that matches the shape of the cross-sectional area of the attachment section 190 along the x-y axis.

The air intake aperture 138 defines a pair of slots 200, 202 that match the shape of the wings 192, 194. In this manner, the pair of slots 200, 202 are configured to receive the pair of wings 192, 194 when the attachment section 190 is inserted through the air intake aperture 138. More generally, the air intake aperture 138 matches the shape of the cross-sectional area of the attachment section 190 along the x-y axis and the slots 200, 202 are positioned 180 degrees apart. The slots 200, 202 are aligned with slots 196, 198. Other embodiments of the air intake aperture 138 may be any suitable shape that matches the shape of the cross-sectional area of the attachment section 190 along the x-y axis.

To mount the air diverter 108, the air diverter 108 is inserted through the air intake aperture 138 and the air intake portal 136 from the side of the upper panel 114 with the interior surface 134 to the side of the upper panel 114 on the exterior surface 132. To do this, the wings 192, 194 are aligned with the slots 200, 202 of the air intake portal 138 and the slots 196, 198 of the air intake aperture 138.

The attachment section 190 is then inserted through the air intake aperture 138 and the air intake portal 136 until the wings 192, 194 are just above the exterior surface 132 of the upper panel 114. As shown, relative to the x-y axis, the pair of slots 196, 198 are both substantially orthogonal to the pair of stops 186, 188. Thus, relative to the x-y axis, when the wings 192, 194 are initially inserted through the slots 196, 198, the wings 192, 194 will initially also be substantially orthogonal to the pair of stops 186, 188. The attachment section 190 is operable to be twisted so that the pair of wings 192, 194 engage the pair of stops 186, 188 once the attachment section 190 is inserted through the air intake portal 136 and the air intake aperture 138.

As shown in FIG. 8A and FIG. 8B, the attachment section 190 further defines a pair of vertical stops 204, 206 that extend horizontally from the attachment section 190. The vertical spacing between the pair of wings 192, 194 and the vertical stops 204, 206 is sufficient to receive a thickness of the upper panel 114 and a thickness of the repellant liner 106. In this manner, the vertical stops 204, 206 stop the attachment section 190 from going entirely through the air intake portal 136. Once the wings 192, 194 are twisted to rest against the stops 186, 188, which prevents the attachment section 190 from continuing to twist, and the vertical stops 204, 206 hit the repellant liner 106, the attachment section 190 is mounted to the upper panel 114. The exhaust conduit 142 can then be connected to the attachment section 190 so as to be connected to the blower 104.

Referring again to FIG. 1 and FIG. 2, FIG. 1 and FIG. 2 illustrate one embodiment of the blower 104. In one embodiment, the blower 104 is a motorized, battery powered fan blower, which a beekeeper can turn on and off with a mechanical switch 208. The blower 104 may generate the air flow 110 so as to prevent too much intoxicating bee repellent entering the honey super 112 during bee evacuation. In some embodiments, the air blower 104 is configured to be off, have a low speed for the air flow 110, and a high speed for the air flow 110. Because the air diverter 108 is detachable from the exhaust conduit 142. The blower 104 can be easily removed from the fume board box 102, thus improving the mobility of the fume board 100 in large apiaries, during shipping or when stored.

In this embodiment, the blower 104 includes a lower blower housing 210, internal fan blades 212, and upper fan housing 214, batteries 216, the upper blower housing top 218, and the exhaust conduit 142. As shown, the housing of the blower 104 splits into the lower blower housing 210 and the upper blower housing 214. Between the lower blower housing 210 and the upper blower housing 214 is the internal fan blades 212 that are driven by a motor (not explicitly shown) to generate the air flow 110 discussed above. The spinning of the internal fan blades 212 is powered by batteries 216 wherein the air flow 110 is driven into the exhaust conduit 142. The upper blower housing top 218 covers the batteries 216. The blower 104 may be switched between a low fan mode and a high fan mode. In the low fan mode, the airflow 110 has less air pressure than in the high fan mode.

Alternative embodiments may utilize an air diverter or diverters permanently attached to the underside of the interior surface 134 of the fume board box 102. Unlike the embodiment discussed herein, in an alternative embodiment the blower connecting mechanism does not attach directly to an air diverter, but instead simply directs a low-volume airflow from a blower exhaust into a fume board box, where the low-volume airflow strikes a stationary non-detachable air diverter positioned directly beneath the air intake portal.

As the low-volume air flow strikes the stationary, non-detachable air diverter, it is deflected evenly across the fume board box where it mixes with a repellant volatized from an absorbent foam liner. A stationary non-detachable air diverter may be attached to the interior surface 134 of a fume board box utilizing screws with screw spacers, or any other method of attachment which creates spatial separation between the intake portal and stationary air diverter below, preferably between 0.75 and 1.00 inch to effectuate even air flow dispersal through the fume board box. In this alternative embodiment, stationary air diverters may be made of any suitable material like plastic or wood, and attached in any number of ways beneath an incoming low-volume air flow.

Because one of the intended purposes of the disclosed embodiments is to provide a low-volume controlled air flow into a fume board box where it mixes with bee repellant, which is then dispersed evenly into a honey super, embodiments described herein lend themselves to various embodiments, incorporating a source of repellant outside the fume board box 102, rather than utilizing a repellant liner 106 attached beneath the top of the fume board box 102. One alternative embodiment includes a fume board box with an external screened-top canister holding a saturated repellant filter. The canister is positioned above, and connected to the blower air intake opening, so that the blower pulls outside air into and through the saturated repellant filter inside the canister, then delivers the volatized repellant through a blower exhaust conduit into the fume board box where it is dispersed evenly into the honey super by a detachable or stationary air diverter.

While this embodiment may provide the blower with the repellant canister being positioned externally on top of the fume board box, alternative embodiments may enlarge the fume board box, incorporating two compartments: an upper and a lower compartment. The upper compartment holds a blower mechanism and repellant filter canister vented out the top, and the lower compartment contains the air diverter devices directly above the honey super.

The external canister and lid may be made of plastic or any other suitable material. The repellant filter may be made from any suitable filter material that does not react adversely to the chemical properties of bee repellants commonly used in traditional fume board boxes. The repellant filter may be manufactured without self-contained repellant properties, requiring the beekeeper to spray the repellant filter prior to use; or the repellant filter may be manufactured with a repellant-infused filter, thus eliminating the need to spray the repellant filter prior to use. The repellant filter may be manufactured from material intended for limited use duration (i.e., disposable), or long life material intended to be used for an extended length of time. The external canister and repellant filter may be designed and manufactured as separate components or as a single unit. The external canister may be designed and manufactured for long-term use, or as short-life, disposable item.

As can be seen from these descriptions of various embodiments the function of the embodiments to utilize a blower to deliver a controlled, low-volume air flow of volatized repellant evenly into a honey super to effectively evacuate bees from a honey super without harming or traumatizing the bees. In yet another alternate embodiment, various fan motors are contemplated, including, but not limited to small fan motors—electric or manually powered—to force low volume air flow into a fume board box, which is then disperse by an air diverter or diverters throughout the fume board box so that the low-volume air flow increases the speed and efficacy of dispersal of bee repellant into honey supers for bee evacuation purposes related to honey extraction.

Those skilled in the art will recognize improvements and modification to the preferred embodiments of the present disclosure. All such improvements and modifications are considered within the scope of the concepts disclosed herein and the claims that follow.

What is claimed is:

1. A fume board, comprising:
   a fume board box comprising an upper panel wherein the fume board box defines an open bottom face oppositely vertically disposed from the upper panel and wherein the upper panel defines an air intake portal and an interior surface;
   a blower configured to generate air flow;
   a repellant liner that is attached on the interior surface of the upper panel;
   an air diverter that is connected to the blower through the air intake portal, wherein the air diverter is configured to redirect the air flow across the repellant liner.

2. The fume board of claim 1, further comprising an exhaust conduit attached between the blower and the air diverter, wherein:
   the exhaust conduit is configured to direct the air flow in a vertical direction into the fume board box; and
   the air diverter comprises a first air duct configured to redirect the air flow in a first horizontal direction that is substantially orthogonal to the vertical direction.

3. The fume board of claim 2, wherein the air diverter further comprises a second air duct that is configured to redirect the air flow in a second horizontal direction such that the second horizontal direction is at approximately 180 degrees relative to the first horizontal direction.

4. The fume board of claim 3, wherein the air diverter further comprises a third air duct that is configured to redirect the air flow in a third horizontal direction, wherein the third horizontal direction is substantially orthogonal to both the first horizontal direction and the second horizontal direction.

5. The fume board of claim 4, wherein the air diverter further comprises a fourth air duct that is configured to redirect the air flow in a fourth horizontal direction, wherein the fourth horizontal direction is at approximately 180 degrees from the third horizontal direction and substantially orthogonal to both the first horizontal direction and the second horizontal direction.

6. The fume board of claim 2, wherein the air diverter further comprises a second air duct that is configured to redirect the air flow in a second horizontal direction such that the second horizontal direction is substantially orthogonal relative to the first horizontal direction.

7. The fume board of claim 1, further comprising a pair of stops that are adjacent to the air intake portal and on an exterior surface of the upper panel, wherein the pair of stops are oppositely disposed from one another, wherein the air diverter comprises an attachment section that is inserted through the air intake portal, the attachment section defining a pair of oppositely disposed wings such that the attachment section is operable to be twisted so that the pair of wings engage the pair of stops once the attachment section is inserted through the air intake portal.

8. The fume board of claim 7, wherein the air intake portal defines a pair of slots that are oppositely disposed and configured to receive the pair of wings when the attachment section is inserted through the air intake portal.

9. The fume board of claim 8, wherein the pair of slots are positioned so as to both be substantially orthogonal to the pair of stops.

10. The fume board of claim 8, wherein the attachment section further defines a pair of vertical stops that extend horizontally from a main portion of the attachment section, wherein a vertical spacing between the pair of wings and the pair of the vertical stops is sufficient to receive a thickness of the upper panel and a thickness of the repellant liner.

11. A fume board, comprising:
- a fume board box comprising an upper panel wherein the fume board box defines an open bottom face oppositely vertically disposed from the upper panel and wherein the upper panel defines an air intake portal and an interior surface;
- a blower configured to generate air flow;
- a repellant liner that is attached on the interior surface of the upper panel, the repellant liner defining an air intake aperture that is aligned with the air intake portal;
- an exhaust conduit;
- an air diverter that is connected to the exhaust conduit to receive the air flow, wherein the air diverter is inserted through the air intake portal and the air intake aperture and wherein the exhaust conduit is configured to direct air flow in a vertical direction into the fume box and the air diverter is configured to redirect the air flow horizontally across the repellant liner.

12. The fume board of claim 11, wherein the exhaust conduit is attached between the blower and the air diverter, wherein the air diverter comprises a first air duct configured to redirect the air flow in a first horizontal direction that is substantially orthogonal to the vertical direction.

13. The fume board of claim 12, wherein the air diverter further comprises a second air duct that is configured to redirect the air flow in a second horizontal direction such that the second horizontal direction is at approximately 180 degrees relative to the first horizontal direction.

14. The fume board of claim 13, wherein the air diverter further comprises a third air duct that is configured to redirect the air flow in a third horizontal direction, wherein the third horizontal direction is substantially orthogonal to both the first horizontal direction and the second horizontal direction.

15. The fume board of claim 14, wherein the air diverter further comprises a fourth air duct that is configured to redirect the air flow in a fourth horizontal direction, wherein the fourth horizontal direction is at approximately 180 degrees from the third horizontal direction and substantially orthogonal to both the first horizontal direction and the second horizontal direction.

16. The fume board of claim 12, wherein the air diverter further comprises a second air duct that is configured to redirect the air flow in a second horizontal direction such that the second horizontal direction is substantially orthogonal relative to the first horizontal direction.

17. The fume board of claim 11, further comprising a pair of stops that are adjacent to the air intake portal and on an exterior surface of the upper panel, wherein the pair of stops are oppositely disposed from one another, wherein the air diverter comprises an attachment section that is inserted through the air intake portal, the attachment section defining a pair of oppositely disposed wings such that the attachment section is operable to be twisted so that the pair of wings engage the pair of stops once the attachment section is inserted through the air intake portal.

18. The fume board of claim 17, wherein the air intake portal defines a pair of slots that are oppositely disposed and configured to receive the pair of wings when the attachment section is inserted through the air intake portal.

19. The fume board of claim 18, wherein the pair of slots are position so as to both be substantially orthogonal to the pair of stops.

20. The fume board of claim 18, wherein the attachment section further defines a pair of vertical stops that extend horizontally from the attachment section, wherein a vertical spacing between the pair of wings and the pair of vertical stops is sufficient to receive a thickness of the upper panel and a thickness of the repellant liner.

* * * * *